United States Patent [19]

Cheng et al.

[11] Patent Number: 5,508,868
[45] Date of Patent: Apr. 16, 1996

[54] DUAL ELEMENT MAGNETORESISTIVE SENSING HEAD HAVING IN-GAP FLUX GUIDE AND FLUX CLOSURE PIECE WITH PARTICULAR CONNECTION OF MAGNETORESISTIVE SENSING ELEMENTS TO DIFFERENTIAL AMPLIFIER

[75] Inventors: Shih-Cheng Cheng, Milpitas; Daniel A. Nepela, San Jose, both of Calif.

[73] Assignee: Read-Rite Corporation, Milpitas, Calif.

[21] Appl. No.: 364,387

[22] Filed: Dec. 23, 1994

Related U.S. Application Data

[63] Continuation of Ser. No. 8,649, Jan. 25, 1993, abandoned.

[51] Int. Cl.⁶ ..................................................... G11B 5/39
[52] U.S. Cl. ............................................................ 360/113
[58] Field of Search .......................... 360/113; 338/32 R; 324/252

[56] References Cited

U.S. PATENT DOCUMENTS

| | | | |
|---|---|---|---|
| 3,860,965 | 1/1975 | Voegeli | 360/113 |
| 3,947,889 | 3/1976 | Lazzari | 360/113 |
| 3,969,769 | 7/1976 | Gorter et al. | 360/113 |
| 3,975,772 | 8/1976 | Lin | 360/113 |
| 4,012,781 | 3/1977 | Lin | 360/113 |
| 4,100,583 | 7/1978 | Koel et al. | 360/113 |
| 4,356,523 | 10/1982 | Yeh | 360/113 |
| 4,388,662 | 6/1983 | Jeffers et al. | 360/113 |
| 4,413,296 | 11/1983 | Jeffers | 360/113 |
| 4,700,252 | 10/1987 | Muraoka et al. | 360/113 |
| 4,814,918 | 3/1989 | Somers | 360/113 |
| 4,878,140 | 10/1989 | Gill et al. | 360/113 |
| 4,901,177 | 2/1990 | Lazzari | 360/113 |
| 4,907,113 | 3/1990 | Mallary | 360/113 |
| 4,954,920 | 9/1990 | Yamada et al. | 360/113 |
| 5,073,836 | 12/1991 | Gill et al. | 360/113 |
| 5,115,364 | 5/1992 | Somers | 360/113 |
| 5,291,363 | 3/1994 | Somers | 360/113 |
| 5,323,285 | 6/1994 | Smith | 360/113 |

FOREIGN PATENT DOCUMENTS

| | | | |
|---|---|---|---|
| 0519674 | 12/1992 | European Pat. Off. | 360/113 |
| 3644388 | 7/1987 | Germany | 360/113 |
| 61-039916 | 2/1986 | Japan | 360/113 |
| 61-073220 | 4/1986 | Japan | 360/113 |
| 61-104413 | 5/1986 | Japan | 360/113 |

Primary Examiner—Stuart S. Levy
Assistant Examiner—Craig A. Renner
Attorney, Agent, or Firm—Nathan N. Kallman

[57] ABSTRACT

A sensing head for detecting flux representative of signals recorded on a magnetic medium includes dual magnetoresistive (MR) elements, an in-gap flux guide partly disposed between the elements and a flux closure piece having ends located adjacent to the ends of the MR elements. The assembly provides increased signal sensitivity and minimizes or eliminates the possibility of electrical or magnetic shorting of the elements which may occur by smearing of the MR sensing elements if the elements are disposed at the air bearing surface of a head slider in contact with a rotating disk.

11 Claims, 1 Drawing Sheet

U.S. Patent      Apr. 16, 1996      5,508,868
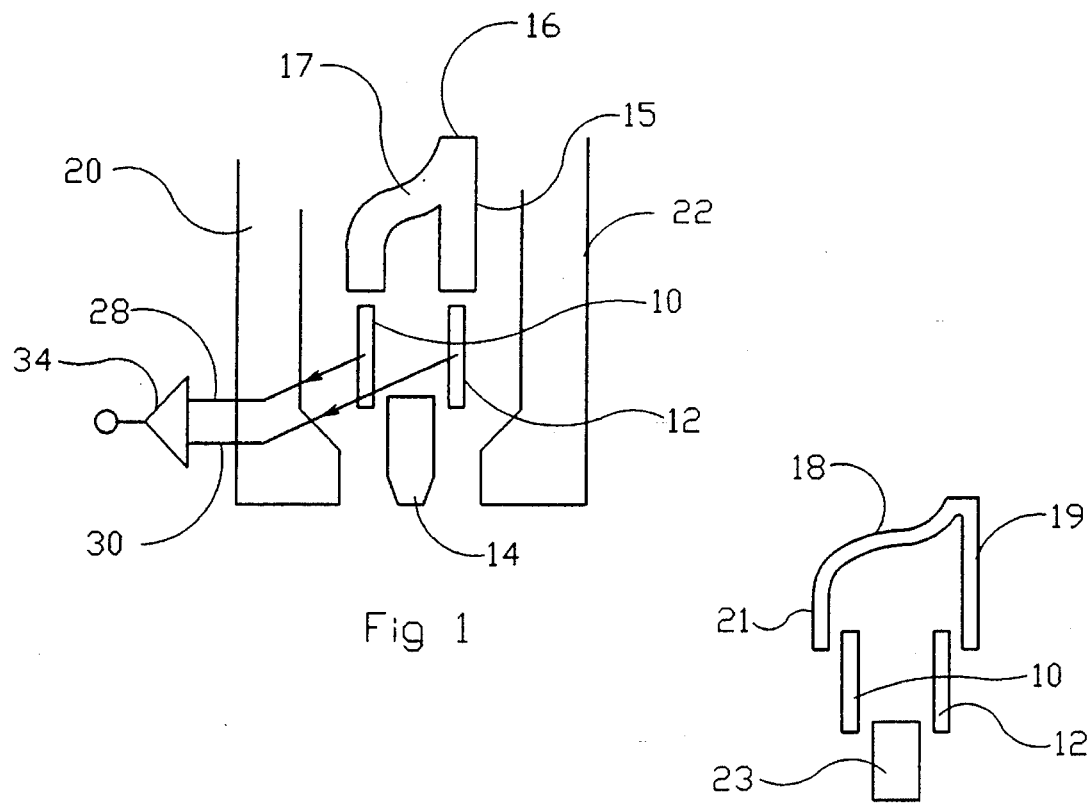
Fig 1
Fig 2
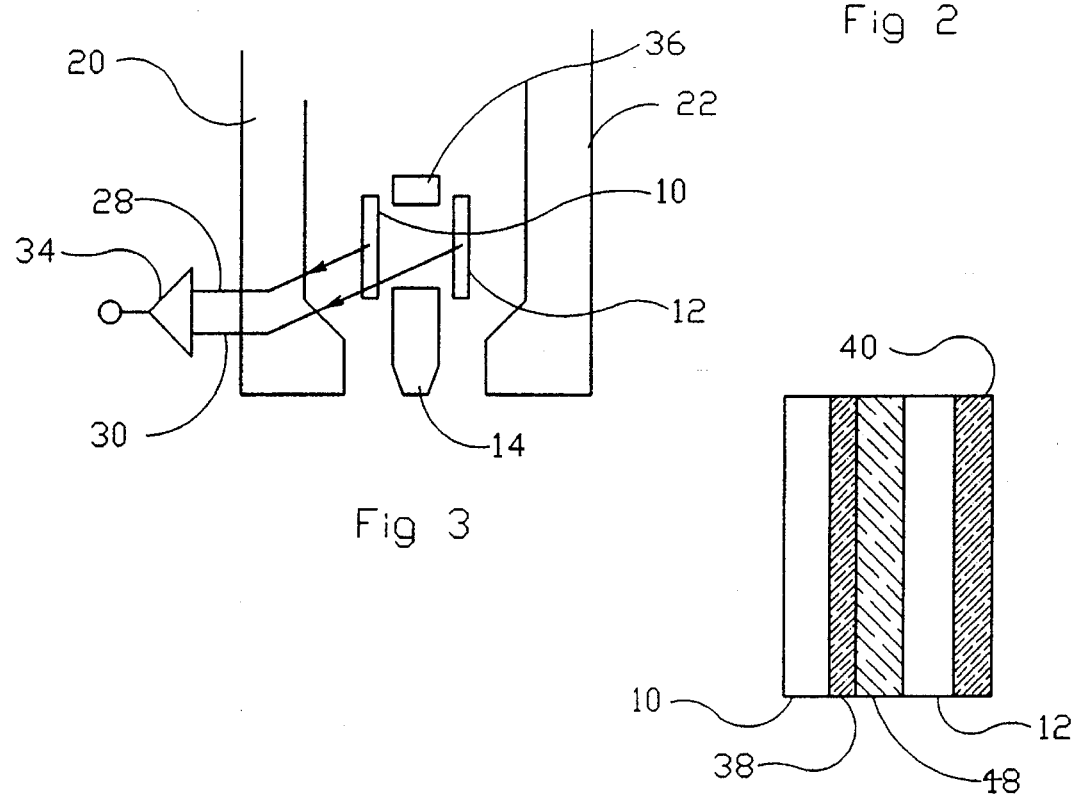
Fig 3
Fig 4

DUAL ELEMENT MAGNETORESISTIVE SENSING HEAD HAVING IN-GAP FLUX GUIDE AND FLUX CLOSURE PIECE WITH PARTICULAR CONNECTION OF MAGNETORESISTIVE SENSING ELEMENTS TO DIFFERENTIAL AMPLIFIER

This application is a continuation of application Ser. No. 08/008,649, filed Jan. 25, 1993, now abandoned.

CROSS-REFERENCE TO COPENDING APPLICATION

Copending patent application Ser. No. 07/976,536 now U.S. Pat. No. 5,309,305 issued on May 3, 1994, entitled "Dual Element Magnetoresistive Sensing Head" and assigned to the same assignee, discloses a dual magnetoresistive (MR) element head using antiferromagnetic thin films to improve the readout signal. The copending application is incorporated herein by reference.

FIELD OF THE INVENTION

This invention relates to a magnetoresistive (MR) sensing head assembly and in particular to a thin film MR head incorporating dual MR elements.

DESCRIPTION OF THE PRIOR ART

Inductive write heads are used for recording information on magnetic media, such as magnetic disks. The recorded information can be read out by an inductive read/write head. Alternatively, MR heads can be used for sensing signals which have been recorded on a magnetic medium. The signal sensed by an MR head is proportional to the magnetic flux associated with the recorded signal, and not to the rate of change of flux which is sensed by an inductive head. Thus an MR head can detect a magnetic field representing a recorded signal without any relative motion between the storage medium and the MR head.

A typical thin film MR head incorporates a single MR element, preferably made of a layer of a highly permeable material of an alloy of nickel and iron, such as PERMALLOY, having an easy axis of magnetization. During operation of a data storage apparatus, such as a disk drive, an electric sense current is directed to the MR element. The magnetic field being sensed exerts a torque on the magnetic moment in the MR thin film causing a change in the resistivity of the film. The change in resistivity is proportional to the strength of the field being measured and causes variations in the resistance of the MR element. Detection of such variations provides a readout signal related to the data signal recorded on the magnetic medium.

One problem that is encountered with dual element MR heads is the potential for electrical shorting of the two MR sensing elements. Another problem is the need to center the gap between the two MR sensors relative to the gap between the two shields. Also if there is too wide a separation between the two MR sensors, a long pulse width results which adversely affects processing the readout signal. Furthermore, interference between the applied sense current and the readout signal may cause large signal peak shifts. Additionally, the strong demagnetizing field that is used with conventional MR sensing heads for suppressing Barkhausen noise results in decreased readout sensitivity.

SUMMARY OF THE INVENTION

An object of this invention is to provide a dual MR element sensing head that virtually eliminates the problem of shorting of the MR elements.

Another object of this invention is to provide a dual MR element head wherein wear of the MR elements is eliminated.

Another object is to reduce interference between the sense current and readout signal.

A further object is to provide a decreased demagnetizing field to achieve increased readout sensitivity.

According to this invention, a dual MR element head includes a short thick flux guide disposed symmetrically between the two MR elements and a flux closure which is located adjacent to the two MR elements. The flux guide is made preferably of high permeability and high resistivity materials, such as CoReZr (cobalt-rhenium-zirconium) or an alloy of iron, aluminum and silicon, such as SENDUST. Antiferromagnetic layers as well as laminated structures may be coupled to the MR elements to achieve improved performance, as disclosed in the aforementioned copending application. The MR elements, the flux guide and the flux closure may have different geometries.

BRIEF DESCRIPTION OF THE DRAWINGS

The invention will be described in greater detail with reference to the drawing in which:

FIG. 1 is a partial cross-sectional representation of an MR sensing head, made in accordance with this invention;

FIG. 2 is a partial cross-sectional representation of an MR sensing head, showing variations in the shapes of the flux guide and flux closure;

FIG. 3 is a partial cross-sectional representation of an MR sensing head illustrating alternative geometries of the components.

FIG. 4 is a partial cross-sectional representation showing the use of antiferromagnetic layers in a dual MR head, as taught in the above identified copending application.

DETAILED DESCRIPTION OF THE INVENTION

With reference to FIG. 1, a dual MR head includes MR sensors 10 and 12 made of thin films of soft magnetic material, such as PERMALLOY for example. The MR sensors are shielded by soft magnetic elements 20 and 22 preferably made of PERMALLOY having a composition of about 81% nickel and 19% iron. Each shield 20 and 22 is about 1.5 to 4.0 microns thick and has a flared portion at the lower end that diverges towards a flux guide 14. The head assembly and shields are deposited on and supported by a substrate (not shown) which may be made of a nonmagnetic ceramic material.

During read operation using the dual MR head assembly, bias (sense) current from a source (not shown) is split substantially equally between MR elements 10 and 12 and directed to a differential amplifier 34 via conductors 28 and 30. A magnetic field is produced at each MR sensor 10 and 12 by the application of the sense current. The magnetic field derived from the applied sense current at each sensor biases the other sensor. The current-derived fields that are applied symmetrically and in opposite directions to the sensors overcome the exchange field in each sensor to place both sensors at the operating point, if the MR sensors are antiferromagnetically coupled, as disclosed in the referenced copending patent application. Without the use of antiferromagnetically coupled MR sensors, optimum bias can be achieved at a lower sense current with a conventional dual MR element sensor.

The dual element MR head with MR layers 10 and 12 senses the recorded signal differentially and the differential signal is fed through leads 28 and 30 to the differential amplifier 34. The differential signal provides common mode rejection of noise from electrical and thermal effects and minimizes harmonic distortion. A higher signal output can be obtained with an increase in signal-to-noise ratio.

In accordance with this invention, the dual MR element head includes a short flux guide 14 having a wedge-shape geometry. The flux guide 14 is relatively short and thick and is characterized by high permeability. In a preferred embodiment of this invention, the flux guide 14 is about 1 micron long and about 2000 Angstroms thick and made of CoReZr (cobalt-rhenium-zirconium) or SENDUST. Laminates formed with nonmagnetic or paramagnetic materials interleaved with soft magnetic materials or alloys may also be used for the flux guide. As shown in FIG. 4, a laminated flux guide is made with MR elements 10 and 12, antiferromagnetic layers 38 and 40, and an insulating layer 48, such as disclosed in the above-referenced copending patent application Ser. No. 07/976,536, which issued as U.S. Pat. No. 5,309,305, and as illustrated in FIG. 1 of the referenced application. An upper portion of the flux guide 14 is located symmetrically in the gap between the base portions of the MR sensors 10 and 12. In effect, the dual MR head with dual sensors incorporates an in-gap flux guide. The interposed flux guide 14 precludes shorting of the MR sensors. In this way, the sensors 10 and 12 can be closely spaced, limited by the width of the short and relatively thick flux guide 14, without electrical shorting. The in-gap flux guide 14 picks up the flux of the signal being sensed on the recorded data storage disk and contributes to the increased readout sensitivity of the MR head. The MR assembly provides increased signal sensitivity and minimizes or eliminates the possibility of electrical or magnetic shorting of the MR elements. Such shorting may occur if the MR sensing elements are located at the air bearing surface of the head slider that flies over the rotating storage disk and makes contact with the disk during disk drive operation to cause smearing between the MR elements.

The novel assembly includes a flux closure piece 16 having a faucet-shaped configuration with a rectangular section 15 and an arcuate section 17. The bottom ends of the flux closure piece 16 are disposed closely adjacent to the top ends of the MR sensors 10 and 12. The flux closure piece 16 is made of a similar material as the flux guide 14, which may be a thin layer of CoReZr or SENDUST. The flux closure piece 16 directs the flux representative of the signal recorded on a magnetic medium to the sensors 10 and 12, thereby increasing readout sensitivity. The dual MR assembly affords reduced wear and thus long use life whereby less maintenance and replacement are required.

FIG. 2 illustrates a modification of the MR head of FIG. 1 wherein the flux closure piece 18 has a narrow rectangular section 19 and a curved section 21. The bases of the two sections 19 and 21 extend partly along the sides of the sensors 10 and 12. The in-gap flux guide 23 which is located symmetrically between the MR sensors is rectangular in shape.

FIG. 3 shows an alternative configuration in which the flux closure piece 36 is configured as a small rectangle and has a lower portion disposed substantially symmetrically between the top portions of the sensors 10 and 12. A flux guide 14 similar to the flux guide shown in FIG. 1 is located partially between the MR sensors.

The head assembly of this invention can be configured simply with PERMALLOY sensors or with antiferromagnetic thin films of iron manganese (FeMn) coupled to the PERMALLOY MR sensing elements. Various shapes of the sensors, flux closure pieces and flux guides can be used. For example, the MR sensors may be made in rhombic form. Modifications in materials, sizes, shapes and other parameters may be made within the scope of the invention.

What is claimed is:

1. A read head assembly for sensing signals recorded on a magnetic medium comprising:

first and second magnetoresistive sensing elements for receiving current-derived fields that are applied symmetrically and in opposite directions to the sensing elements to bias the sensing elements in opposite directions, each sensing element having first and second ends;

first and second magnetic shield members for shielding said sensing elements, said shield members defining a central longitudinal axis, said axis being located substantially centrally between said shield members, said sensing elements being spaced on each side of and equally from said longitudinal axis, the ends of said shield members defining a gap;

a single flux closure piece disposed closely adjacent to said first ends of said sensing elements and located on said longitudinal axis and spaced substantially equally from said shield members;

an in-gap flux guide disposed along said longitudinal axis and centrally in the gap between said shield members and partially between said sensing elements closely adjacent to said second ends of said sensing elements; and a differential amplifier having a pair of inputs coupled to said sensing elements such that each input of said differential amplifier is supplied by current from each individual sensing element, respectively, for providing common mode rejection of the sensed signal and an improved signal-to-noise ratio.

2. An assembly as in claim 1, wherein said flux guide is made of a high permeability and high resistivity material.

3. An assembly as in claim 1, wherein said flux guide is made of cobalt-rhenium-zirconium or iron-aluminum-silicon material.

4. An assembly as in claim 1, wherein said flux guide is made of a laminate using nonmagnetic or paramagnetic materials interleaved with magnetic metals or alloys.

5. An assembly as in claim 1, wherein said flux guide is about 1 micron long and about 2000 Angstroms thick.

6. An assembly as in claim 1, wherein said flux closure piece is made of cobalt-rhenium-zirconium or iron-aluminum-silicon material.

7. An assembly as in claim 1, including antiferromagnetic layers coupled to said sensing elements.

8. An assembly as in claim 1, wherein said flux guide is wedge-shaped.

9. An assembly as in claim 1, wherein said magnetic shield members are about 1.0 to 4.0 microns thick.

10. An assembly as in claim 1, wherein said magnetic shield members are made of soft magnetic material.

11. An assembly as in claim 1, wherein said magnetic shield members are made of an alloy having a composition of approximately 81% nickel and 19% iron.

* * * * *